United States Patent [19]

Ellis

[11] Patent Number: 5,222,750
[45] Date of Patent: Jun. 29, 1993

[54] TOOL-CARRYING APPARATUS AND METHOD

[76] Inventor: A. Harlow Ellis, P.O. Box 370, St. John, V.I. 00831

[21] Appl. No.: 881,128

[22] Filed: May 11, 1992

[51] Int. Cl.⁵ .............................................. B62B 1/14
[52] U.S. Cl. ............................ 280/47.33; 280/47.24; 56/12.7; 172/15; 172/17
[58] Field of Search ............. 280/47.131, 47.17, 47.24, 280/47.32, 47.33; 56/12.1, 12.7, 17.2; 172/14, 15, 16, 17, 42

[56] References Cited

U.S. PATENT DOCUMENTS

| | | | |
|---|---|---|---|
| 2,505,331 | 4/1950 | Lambly et al. | 280/47.33 X |
| 3,788,049 | 1/1974 | Ehrlich | 280/47.17 X |
| 4,182,100 | 1/1980 | Letter | 56/12.7 X |
| 4,224,784 | 9/1980 | Hansen et al. | 56/12.7 X |
| 4,358,123 | 11/1982 | Richards | 280/47.131 |
| 4,531,350 | 7/1985 | Huthmacher | 56/17.1 X |
| 4,879,869 | 11/1989 | Buckendorf, Jr. | 56/12.7 |
| 4,922,694 | 5/1990 | Emoto | 56/12.7 X |
| 5,092,112 | 3/1992 | Buckendorf, Jr. | 56/12.7 X |
| 5,095,687 | 3/1992 | Andrew et al. | 172/17 X |

FOREIGN PATENT DOCUMENTS 1247905 9/1971 United Kingdom ........... 280/47.131

Primary Examiner—Brian Johnson
Attorney, Agent, or Firm—Richard P. Crowley

[57] ABSTRACT

A weed-cutting, tool-carrying apparatus which comprises a pair of wheels secured to the legs of an upright, U-frame, handle element having a connecting bar, a backward, laterally extended, U-frame guide bar and rest element secured to the legs of the U-frame handle element, and a cap and clamping plate secured to the connecting bar, the clamping plate adapted to receive the shaft of the weed-cutting tool, and U-threaded bolts to secure the shaft in an adjustable position within and to the clamping plate, thereby providing an effective carrying apparatus for a portable weed-cutting tool.

16 Claims, 3 Drawing Sheets

TOOL-CARRYING APPARATUS AND METHOD

BACKGROUND OF THE INVENTION

There are a wide variety of portable, handheld, weed- or grass-cutting tools which typically are used for trimming grass and weeds in hard-to-reach places not easily or usually reached by a lawn mower. Such weed-cutting tools are typically portable-type, lightweight tools being carried by the operator, either alone or with the aid of an over-the-shoulder strap. Such tools generally comprise an elongated shaft having at the one end a weed-cutting device, either a blade or a cutting cord, and at the other end a gasoline- or electric-powered motor for driving the cutting blade or cord, and intermediate the cutting head and the power source, and generally toward the power source, is a raised handle for use by the operator, to hold the shaft and direct the weed-cutting head as desired.

It is desirable to provide for a carrying apparatus and method which would permit the weed-cutting tools to be wheeled during use, as opposed to carrying over the shoulder, so as to provide for easier starting operation, particularly for gasoline models, and to lessen operator fatigue by a wheel-carrying apparatus, as opposed to carrying by the operator, and to provide other advantages in use.

SUMMARY OF THE INVENTION

The invention relates to a tool-carrying apparatus and method, and more particularly to a portable, weed-cutting, tool-carrying apparatus and method.

The invention comprises a tool-carrying apparatus, particularly to carry a weed-cutting tool, and adapted for use in securing a portable weed-cutting tool having a shaft, and at the one end a power source, and at the other end a weed-cutting tool, and, optionally, the tool having an intermediate handle. The tool-carrying apparatus permits the easy installation and use of the weed-cutting tool. The tool-carrying apparatus thus lessens operator fatigue, with either the gasoline- or electric-powered models, by permitting wheeling, rather than hand-carrying, of the portable weed-cutting tool, and also provides easier starting operations for gasoline-type models. The tool-carrying apparatus of the invention permits the easy installing and securing of the shaft of the portable weed-cutting tool to the tool-carrying apparatus. Its unique design provides flexibility of use, by adjusting for the height of the cut of weed-cutting, the size of the shaft employed in the weed-cutting tool, the diameter of the line cut, and permits straight cuts for trimming and edging. The tool-carrying apparatus also permits enhanced safety in use of the portable weed-cutting tool, in that the position of the head of the weed-cutting tool between a pair of wheels provides greater safety for the operator from the contact of the tool-cutting head with hidden, hard objects, by minimizing the bounce effect and temporary loss of control of the direction of the cutting head of the portable weed-cutting tool, since it is in a secured position on the tool-carrying apparatus.

The tool-carrying apparatus of the invention is adapted for particular use with portable weed-cutting tools, but may be employed, where advantageous, with other portable, shaft-containing tools. The apparatus typically comprises in combination a pair of spaced-apart wheels, with a generally upright, open-ended, first, U-frame element having side legs with ends and a generally horizontal connecting bar connecting the side legs. The carrying apparatus includes means; for example, threaded bolts, to secure one wheel for rotation on each leg, to permit wheel movement of the first U-frame element, with each side leg secured to a wheel toward the open end, and to permit the adjustable, lateral movement and positioning of the first U-frame element forward or backward; for example, to accommodate the height of the particular operator.

The tool-carrying apparatus also includes a second, open-ended, U-frame element, also having side legs, and a second connecting bar element in which the connecting bar of the second U-frame element is generally disposed backwardly and laterally, and acts as a guide bar, to provide a guide to the operator for height of the lawn or weeds to be trimmed by the weed-cutting head. The U-frame guide bar also serves as a rest, when the tool-carrying apparatus, together with the secured weed-cutting tool, is not in use and tilted backwards, to rest the second connecting bar of the U-frame on the ground. The carrying apparatus also includes means to secure adjustably each end of the legs of the second U-frame element to each end, respectively, of the legs of the first U-frame element, so as to permit adjustable, vertical movement, and positioning of the second U-frame guide-bar element to the desired height, to serve as a guide for the operator for the height of the weeds to be cut. In the nonuse position, the guide-bar element rests directly on the ground. While a U-frame is the preferred guide-bar rest element, other structures, such as one or a pair of leg elements, may be used for the same purpose.

The tool-carrying apparatus also includes a weed-cutting-tool gripping means on the first connecting bar, whereby the shaft of the weed-cutting apparatus is secured in the desired position for the seed-cutting operation, the weed-cutting-tool gripping means includes means to permit the gripping of various shaft diameters and shapes of the weed-cutting tool apparatus. The weed-cutting-tool gripping means is positioned on the first connecting bar, but, optionally and preferably, also should be adjustable, with a sliding, lateral movement, so that the gripping means and thus the cutting head of the secured weed-cutting tool may be positioned to one or the other side between the pair of wheels of the tool-carrying apparatus.

In one preferred embodiment, the weed-cutting-tool gripping means would include a cap plate which fits snugly and matingly over the top portion of the first connecting bar, and an underlying, V-shaped, clamping plate, with the cap plate and the clamping plate to be secured together. The shaft of the weed-cutting apparatus is positioned and threadably secured in the V of the clamping plate, which secures the shaft of the weed-cutting apparatus in position longitudinally between the two, spaced-apart wheels on each side leg of the first U-frame element. The tool-carrying apparatus includes means, such as threaded bolts, to secure the cap plate into position, such as a central or side position, onto the first connecting bar, and also includes means to secure the V-clamping plate to the cap plate in a defined position, and with the V-clamping plate containing at least a pair of slotted holes on either side of the V portions of the clamping plate, such as the use of U-shaped, threaded bolts, to secure the shaft of the weed-cutting tool in a secured position on the V-clamping plate. The shaft of the weed-cutting tool is positioned and secured in the V-clamping plate prior to assembly to the cap plate, and then slidably adjusted and secured to the desired, lateral, weed-cutting position.

Generally, the cap plate will have a shaped channel adapted to fit over and be secured, by threaded bolts, to the first connecting bar element, and have side or wing elements also with bolt holes, so that the adjacent wing elements of the V-clamping plate and the cap plate may be secured together in position, to hold the shaft of the weed-cutting apparatus in an extended, secured, downward position, with the weed-cutting-tool head at the right height, and be governed by the position of the guide bar The apparatus also permits the V-clamping plate and the cap plate to be slid laterally along the first connecting bar and bolted in position, so that the weed-cutting head may be positioned to one or the other side, rather than centrally, as desired by the operator.

The invention also includes in combination the tool-carrying apparatus with a portable weed-cutting tool having a shaft with a first and second end and a handle intermediate ends for use by the operator, and a weed-cutting-tool head at first end and a power source at or toward the second end secured with the tool-carrying apparatus, so that the portable weed-cutting tool may be secured and positioned between the pair of wheels of the tool-carrying apparatus and the cutting-head position, for use at the desired height, and where the first U-frame element may be adjustable forward or backward, to accommodate the height of the operator.

The invention includes a method of carrying and using a portable, weed-cutting tool, which method comprises securing the shaft of a weed-cutting tool to the connecting bar of a U-frame handle, which U-frame handle is generally upright and adjustable laterally, with each leg containing a pair of spaced-apart wheels for permitting the operation of the wheels and carrying of the portable tool-carrying apparatus. The method includes adjusting the angular position of the shaft of the weed-cutting tool in the gripping means or V-channel, to position the head at the desired level, so that the shaft extends downwardly between the pair of spaced-apart wheels, and optionally adjusting a rearward, laterally extended, U-shaped guide bar, to serve as a guide for the height of the cutting of the weeds by the cutting head of the weed-cutting tool. The method also includes laterally adjusting the generally upright, U-frame handle, to accommodate the height of the operator, thereby providing an effective, easily assembled, tool-carrying apparatus. The apparatus permits the wheeling, rather than the portable use, of the weed-cutting tool by an operator, and permits adjustment of the U-frame handle for the height of the operator, and adjustment of the guide bar for the height of the cut, and adjustment of the gripping means for the size of the shaft of the weed-cutting tool, and permits the lateral movement of the gripping means on the handle, so as to permit the weed-cutting tool to cut either centrally between the wheels or to one or the other side.

The invention will be described for the purposes of illustration only, in connection with certain embodiments; however, it is recognized that various modifications, additions, improvements and changes may be made to the illustrated embodiments, without departing from the spirit and scope of the invention.

DESCRIPTION OF THE EMBODIMENTS

Figure 1:
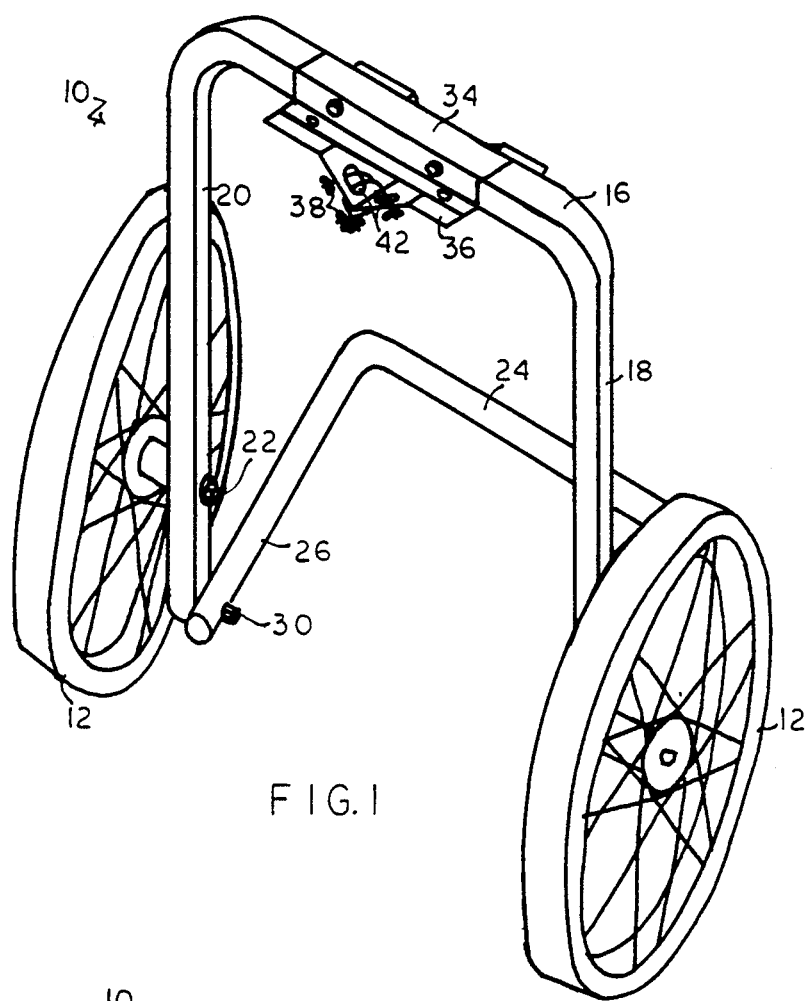
FIG. 1 is an illustrative, perspective view of the tool-carrying apparatus of the invention.
Figure 2:
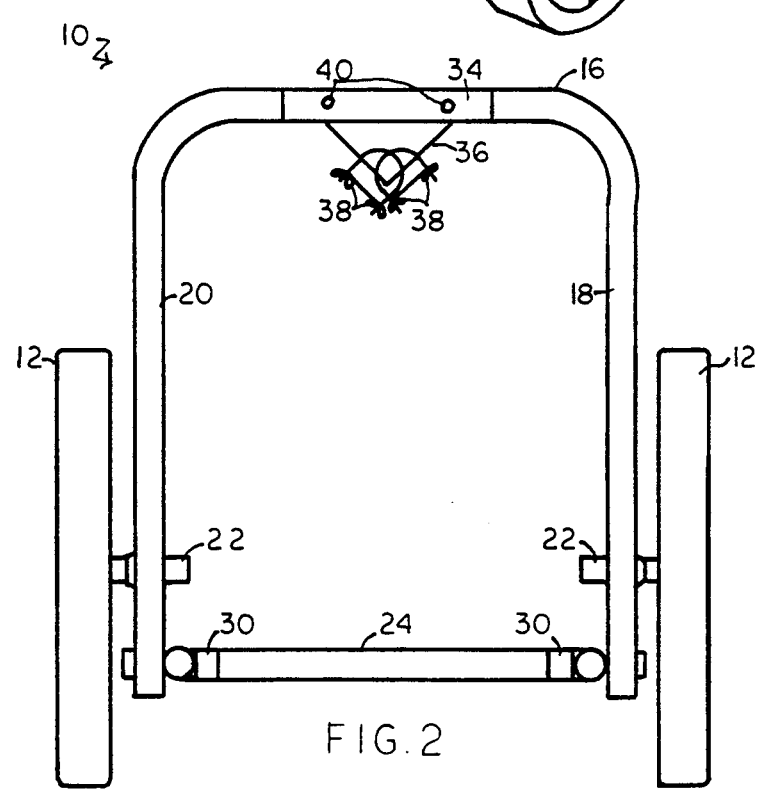
FIG. 2 is a front plan view of the tool-carrying apparatus of FIG. 1.
Figure 3:
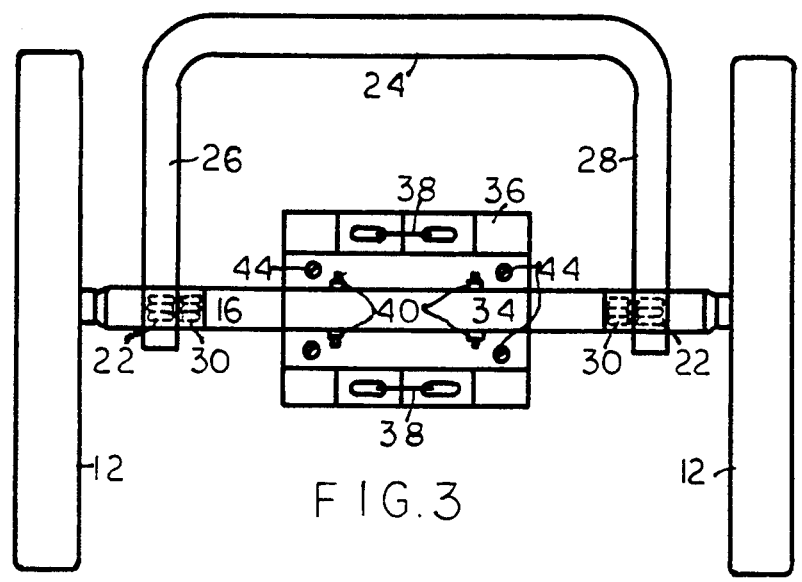
FIG. 3 is a top plan view of the tool-carrying apparatus of the FIG. 1.

With particular reference to FIGS. 1-3, there is shown a tool-carrying apparatus 10, which includes a pair of spoked wheels 12, and a generally upright, first, open-ended, U-frame element 16 having side legs 18 and 20, with the side legs put together by a connecting bar, with the U-frame element shown as an integral, one-piece element 16. Axle bolts and washers 22 are employed to connect the wheels 12 to legs 18 and 20. The apparatus 10 also includes a rearward, laterally extending, second, open-ended, U-frame, guide bar 24, having side legs 26 and 28, the side legs connected by a threaded bolt 30 to the end of the legs 20 and 18 of U-frame element 16, so as to permit the guide bar 24 to be adjusted laterally, upwardly or downwardly, to the height of the weeds or grass to be trimmed, so as to act as a weed-height guide bar. The guide bar yet also is secure enough, so that, when the tool-carrying apparatus 10 is not in use, the apparatus 10 may be tilted backward, with the guide bar 24 resting on the ground, to place the tool-carrying apparatus 10 and the secured weed-cutting tool therein in a nonuse, resting position.

Figure 4:
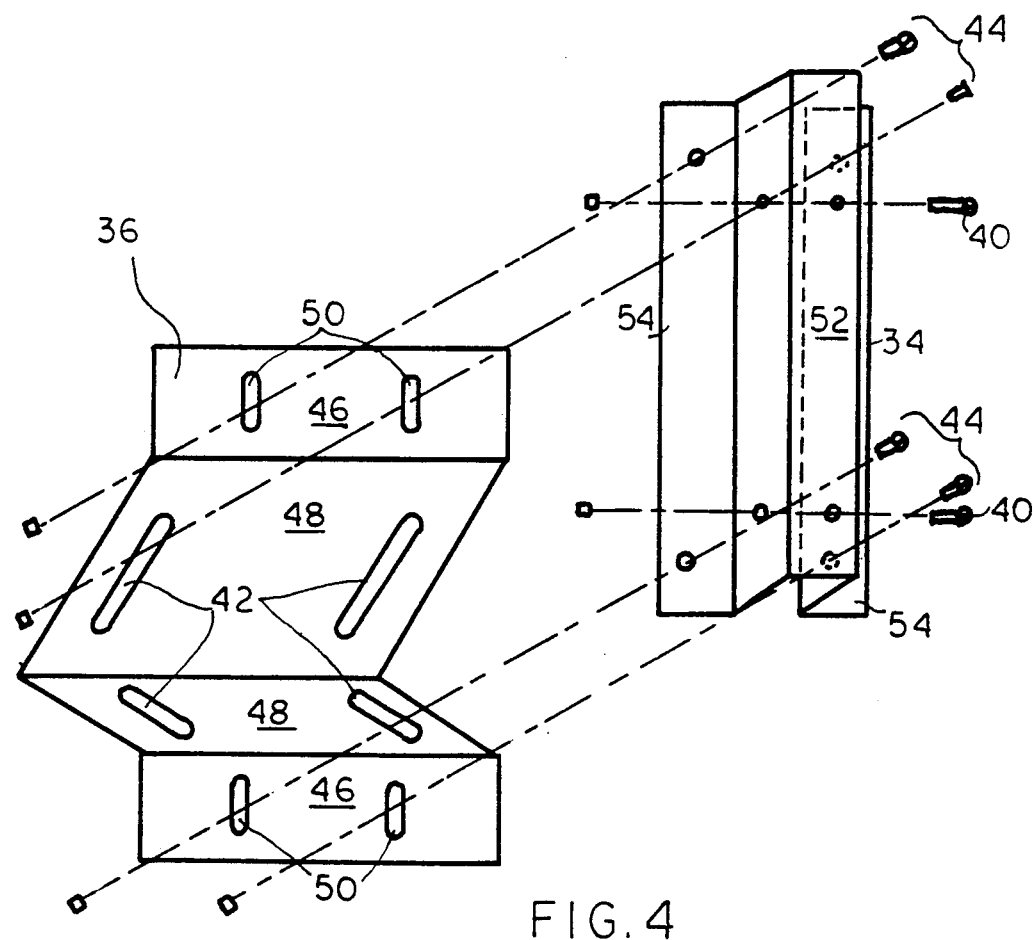
FIG. 4 is an illustrative, perspective, exploded view of the weed-cutting-tool gripping means of the tool-carrying apparatus as shown in FIGS. 1-3.

A weed-cutting, tool-shaft gripping means is shown as comprising a U-channel cap plate 34 and an underlying V-shaped plate 36 (see more particularly the exploded view in FIG. 4), the plates threadably bolted and connected together, and the V-shaped plate beneath the underside of the connecting bar of the first frame element 16, and, as illustrated in FIGS. 1-3, without the shaft of the weed-cutting apparatus therein, adapted to receive a shaft of a weed-cutting apparatus to be secured in the V-shaped plate. As illustrated in FIG. 4, the V-shaped plate permits the receipt of shaft diameters of different shapes and sizes. The V-shaped plate includes a pair of flat wing elements 46 containing slotted holes 50, and V-shaped plate elements 48 containing a pair of slotted holes 42. The cap element 34 includes a generally U-shaped cap 52 adapted to fit snugly over the top of the rectangular connecting bar of the frame 16, and also having flat, side wing elements 54 with bolt holes therein, so that threaded bolts 44 and nuts may be employed through the bolt holes in the cap plate wings 54 and into the slotted holes 50 of the V-shaped plate 36, to secure the plates 34 and 36 together to the bar 16. The apparatus 10 includes a pair of threaded U-bolts 38 placed through the slotted holes 42 adapted to secure and, on tightening, to hold the shaft of the weed-cutting apparatus within the clamp plate 48 (see FIGS. 3 and 4).

Figure 5:
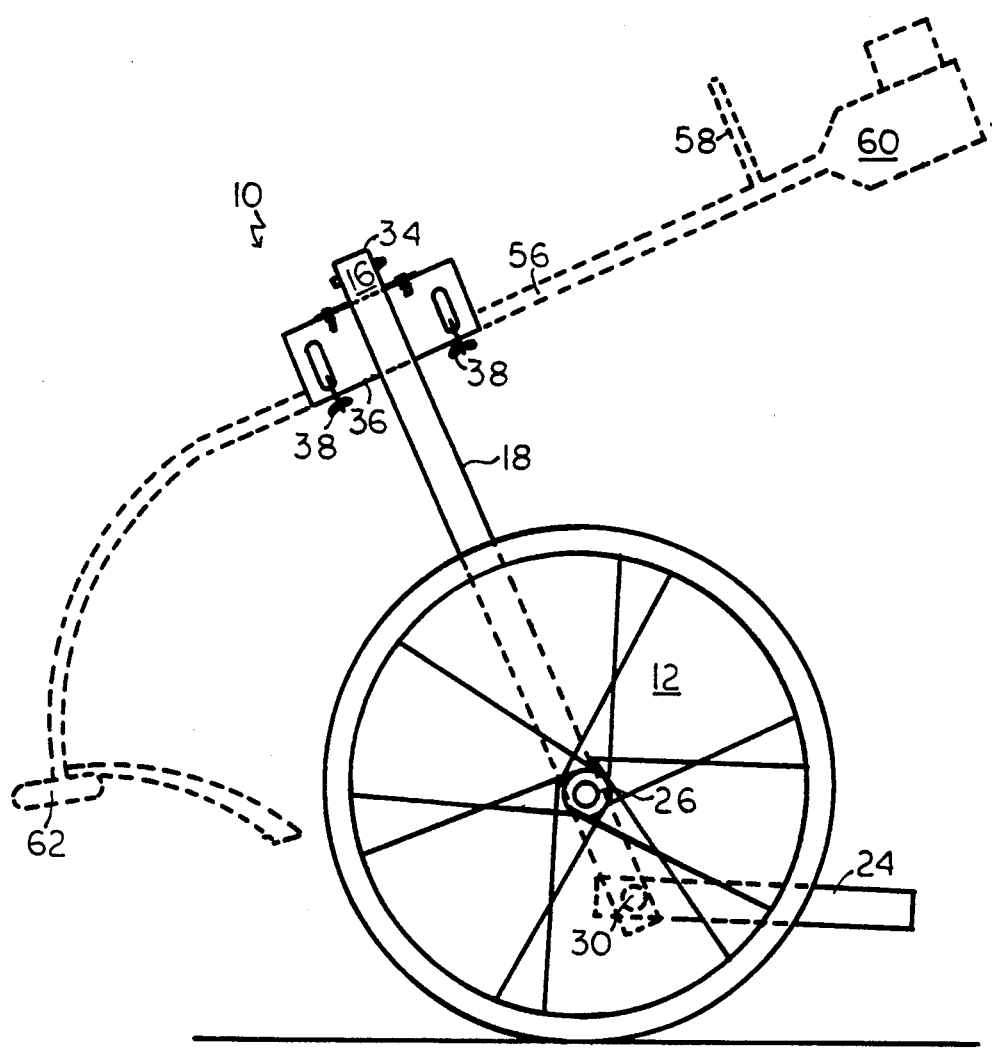
FIG. 5 is a side plan view of the tool-carrying apparatus in use, with a weed-cutting tool secured to the tool-carrying apparatus and illustrated in dotted lines.

FIG. 5 is an illustration of a weed-cutting-tool apparatus having an elongated shaft 56 generally, in the illustrated model, curved downwardly at the one end, a handle 58, a power source 60, such as a gasoline motor, to power the weed-cutting apparatus, and having a curved, downwardly extending shaft end, with a cutting tool 62, such as a cord or a blade, as illustrated, connected to the weed-cutting head 62, for use in cutting weeds, grass, etc. The cylindrical shaft 56 of the weed-cutting apparatus is positioned and secured within the confines of the V-clamp plate 36 by the two threaded bolts 38. The shaft is secured in a desired position and extends downwardly, so that downward movement of bar 16 places the head 62 in a weed-cutting position. The guide bar 24 has been adjusted through adjustment of bolts 30, to provide a guide height as to the height of the weed cut. As shown more particularly in FIG. 5, the first frame element has been adjusted forwardly, to accommodate the particular height of the operator, and, therefore, forms a generally obtuse angle with the guide bar 24. As illustrated in FIG. 3, the weed-cutting, shaft gripping means generally has been centrally positioned between the wheels 12; however, cap plate 34 and the V-clamp plate 36 may be loosened and then slid laterally along the connecting bar of the U-frame 16, so as to position the cutting head 62 of the weed-cutting apparatus to one or the other sides, rather than centrally.

The tool-carrying apparatus and method as described and illustrated provide for easy wheeled use of a portable weed-cutting tool, the adjustment of the head of the tool, the use of a guide bar as a rest for the tool-carrying apparatus, and with the U-frame adjustable for the height of the operator, and with the weed-cutting-tool, shaft gripping means adjustable, to accommodate a variety of shaft diameters, and adjustable to be positioned laterally on the U-frame handle; thus, providing for a tool-carrying apparatus which is easy to use and assemble and is adapted to permit the use of a weed-cutting tool with less operator fatigue and enhanced safety.

What is claimed is:

1. A weed cutting, tool carrying apparatus adapted for use with a weed cutting tool having a shaft with a first end and a second end and having a weed cutting head to cut weeds and grass to a desired height at the first end and a power source for the weed cutting head at the second end, which apparatus comprises:
   a) a pair of spaced apart, generally parallel wheels;
   b) a generally vertically upright first U-frame element having side legs and ends and a generally horizontal first connecting bar interconnecting the side legs;
   c) means to secure one wheel for rotations to each end of the legs to permit wheel movement of the first U-frame element and positioning thereof to accommodate the height of the user;
   d) a guide bar and rest means extending generally backwards from the first U-frame element and secured to the legs of the first frame element to permit the guide bar and rest means to serve as a guide for the desired height of the weeds to be cut and to act as a rest on the ground when the tool carrying apparatus is not in use; and
   e) a weed cutting tool shaft gripping means mounted on the horizontal first connecting bar and which includes a V-shaped clamping plate therein adapted to receive within the V-shaped clamping plate the shaft of the tool apparatus and retainer means adapted to secure the shaft of the weed cutting tool in the desired weed cutting position within the V-shaped clamping plate.

2. The apparatus of claim 1 wherein the V-shaped clamping plate includes a pair of angled plates, each plate having a pair of spaced apart, parallel, elongated slots therein and the retainer means comprises a pair of threaded U-bolt retainers which extend through the respective elongated slots and about the shaft of the weed cutting tool.

3. The apparatus of claim 1 wherein the weed cutting tool shaft gripping means comprises a cap plate to fit over the first connecting bar and a V-shaped clamping plate secured to the cap plate and to receive within the V-shape of the clamping plate the shaft of the weed cutting tool; and retainer means to secure the shaft within and between the V-shaped clamping plate and the cap plate on the first connecting bar.

4. The apparatus of claim 3 wherein the means to secure the shaft of the weed cutting tool to the weed cutting tool gripping means includes a pair of threaded U-bolts extending through the V-shaped clamping plate.

5. The apparatus of claim 3 wherein the cap plate includes a central channel plate with two laterally extending side plates, and the V-shaped clamping plate includes a central, V-shaped plate and two laterally extending side plates, the U-shaped cap plate adapted to fit matingly and slidably over the first connecting bar for lateral adjustment, and means wherein the respective side plates of the cap plate and the V-shaped plate are threadably secured together.

6. The apparatus of claim 5 wherein the V-shaped clamping plate has extended sides which sides include a pair of spaced apart elongated slots, and wherein the retainer means to secure the shaft of the weed cutting tool, within the V-shaped clamping plate, includes a pair of threaded retainers extending through the elongated slots.

7. The apparatus of claim 1 wherein the guide bar and rest means comprises a second U-frame element having side legs, each of the legs connected to a corresponding leg of the first U-frame element and generally horizontally extending backward from the first U-frame element.

8. The apparatus of claim 1 wherein the first U-frame element extends slightly forward and forms a generally obtuse angle with the backwardly extending guide bar and rest means.

9. The apparatus of claim 1 wherein the gripping means includes means to position slidably the gripping means on the first connecting bar for lateral adjustment of the gripping means and the shaft of the weed cutting tool between the pair of spaced apart wheels.

10. In combination, a weed cutting tool with a shaft having a first and a second end, with a weed cutting head at the first end and power source means at the second end and the apparatus of claim 1 wherein the shaft is secured in a defined position within the weed cutting tool gripping means.

11. A tool carrying apparatus adapted for use with a portable, weed cutting tool, having a shaft with a first and second end, and a power source at the second end and a cutting head at the first end to cut weeds and grass, which apparatus comprises:
   a) a pair of spaced apart wheels;
   b) a generally upright, first U-frame element having side legs with ends and a generally horizontal first connecting bar connecting the side legs;
   c) means to secure one wheel to each of the side legs of the first U-frame element for rotation, to permit wheel movement of the first U-frame element, and positioning thereof to accommodate the height of the operator:
   d) a second, generally backwardly extending, lateral guide bar U-frame element having side legs and ends, and a generally horizontal second connecting bar element, the second U-frame element to provide a guide to the height of the weeds and grass to be cut by the seed cutting tool and to serve as a rest, together with the wheels, when the tool carrying apparatus is not in use, by resting the second connecting bar on the ground;

e) means to secure adjustably each end of the legs of the second U-frame element to each end of the legs of the first U-frame element, to permit adjustable, vertical movement and positioning of the second U-frame element as a guide bar;

f) a weed cutting tool gripping means which comprises in combination a cap plate which fits over the first connecting bar and is slidably adjustable thereon, and a V-clamping plate secured beneath the cap plate, the V-shaped clamping plate adapted to receive the shaft of the weed cutting tool, and having a pair of opposing slotted holes in each side of the V-clamping plate;

g) threaded bolt means extending through holes of the V-clamping plate, adapted to secure the shaft of the weed cutting tool; and h) threaded means to secure the cap plate and the V-clamping plate together to retain the weed cutting tool gripping means to the first connecting bar.

12. In combination a weed cutting tool apparatus having a shaft, the shaft secured in a defined position in the gripping means of the tool carrying apparatus of claim 11.

13. A weed cutting tool carrying apparatus adapted for use with a weed cutting tool having a shaft with a first end and a second end and having a weed cutting head to cut weeds and grass to a desired height and a power source for the weed cutting head at the second end, which apparatus comprises:

a) a pair of spaced apart, generally parallel wheels;

b) a generally vertically, upright first U-frame element having side legs and ends and a generally horizontal first connecting bar between the side legs;

c) means to secure one wheel for rotation to each end of the legs to permit wheel movement of the first U-frame element and positioning thereof to accommodate the height of the user;

d) a guide bar and rest means extending generally horizontally backwards from the first U-frame element to permit the guide bar and rest means to serve as a guide for the desired height of the weeds to be cut and to act as a rest on the ground when the tool carrying apparatus is not in use; and e) a weed cutting tool shaft gripping means mounted on the horizontal first connecting bar to permit lateral adjustment of the weed cutting tool portion between the wheels and including means attached thereto adapted to secure one of variable diameter shafts of the weed cutting tool in a desired weed cutting position.

14. The apparatus of claim 13 wherein the gripping means comprises a V-shaped clamping plate secured to the horizontal connecting bar and adapted to receive and secure the shaft of a weed cutting tool therein.

15. The apparatus of claim 14 which includes a cap plate fitted on the first connecting bar and secured to the V-shaped plate.

16. In combination a weed cutting tool aparatus having a shaft, the shaft secured in a defined position in the gripping means of the tool carrying apparatus of claim 13.

* * * * *